United States Patent [19]

Coelho

[11] Patent Number: 5,793,428
[45] Date of Patent: Aug. 11, 1998

[54] SELF-ENCODED DELTAS FOR DIGITAL VIDEO DATA TRANSMISSION

[75] Inventor: Rohan G. F. Coelho, Portland, Oreg.

[73] Assignee: Intel Corporation, Santa Clara, Calif.

[21] Appl. No.: 833,583

[22] Filed: Apr. 7, 1997

Related U.S. Application Data

[63] Continuation of Ser. No. 365,696, Dec. 29, 1994, abandoned, which is a continuation-in-part of Ser. No. 118,929, Sep. 9, 1993, Pat. No. 5,448,297, which is a continuation-in-part of Ser. No. 78,931, Jun. 16, 1993, Pat. No. 5,351,085.

[51] Int. Cl.$^6$ ........................................... H04N 7/24
[52] U.S. Cl. ........................................... 348/415; 382/236
[58] Field of Search ........................................... 348/384, 390, 348/400, 401, 409–412, 415, 416, 417, 420, 699; 382/232, 236, 238; H04N 7/130

[56] References Cited

U.S. PATENT DOCUMENTS

| | | | |
|---|---|---|---|
| 4,437,119 | 3/1984 | Matsumoto et al. | 348/412 |
| 4,743,959 | 5/1988 | Frederiksen . | |
| 4,857,992 | 8/1989 | Richards . | |
| 4,933,761 | 6/1990 | Murakami et al. . | |
| 4,953,019 | 8/1990 | Skikakura et al. . | |
| 4,974,071 | 11/1990 | Maeda . | |
| 4,994,911 | 2/1991 | Nakayama et al. . | |
| 5,003,299 | 3/1991 | Batson et al. . | |
| 5,008,748 | 4/1991 | Carr et al. | 348/417 |
| 5,046,071 | 9/1991 | Tanoi . | |
| 5,047,853 | 9/1991 | Hoffert et al. . | |
| 5,068,644 | 11/1991 | Batson et al. . | |
| 5,097,330 | 3/1992 | Guichard et al. . | |
| 5,099,325 | 3/1992 | Artieri et al. | 348/412 |
| 5,105,271 | 4/1992 | Niihara | 348/699 |
| 5,122,877 | 6/1992 | Keesman . | |
| 5,124,688 | 6/1992 | Rumball . | |
| 5,150,209 | 9/1992 | Baker et al. . | |
| 5,177,608 | 1/1993 | Ohki et al. . | |
| 5,200,820 | 4/1993 | Gharavi | 348/416 |
| 5,206,723 | 4/1993 | Parke | 348/420 |
| 5,218,431 | 6/1993 | Gleicher et al. . | |
| 5,220,410 | 6/1993 | Wakeland et al. . | |
| 5,241,382 | 8/1993 | Paik et al. . | |
| 5,260,783 | 11/1993 | Dixit | 348/409 |
| 5,317,397 | 5/1994 | Odaka et al. . | |
| 5,341,442 | 8/1994 | Barrett . | |
| 5,351,085 | 9/1994 | Coelho et al. . | |
| 5,448,297 | 9/1995 | Alattar et al. | 348/415 |
| 5,485,213 | 1/1996 | Murashita et al. | 348/415 |

OTHER PUBLICATIONS

Kronander, "Post–and Pre–Processing in Coding of Image Sequences Using Filters with Motion Compensated History" 1988 Int. Conf. Acoustics, Speech. Sig. Processing. vol. 2, Apr. 1988, pp. 1104–1107.

*Primary Examiner*—Richard Lee
*Attorney, Agent, or Firm*—William H. Murray, Esq.

[57] ABSTRACT

Digital video data is transmitted by sending significant pixel data differences, column by column, within the same frame rather than differences between corresponding pixel data of adjacent frames; a "no change" signal is transmitted when a difference between corresponding pixel data of adjacent frames is not significant (i.e. less than a fixed minimum threshold value). This method eliminates the necessity of storing a previous frame's data at the receiver while computing the subsequent frame's data. The technique also eliminates "bleed-through" artifacts sometimes experienced in the prior art during scene transitions.

14 Claims, 9 Drawing Sheets

FIG. 2

| | | | | | | | | |
|---|---|---|---|---|---|---|---|---|
| $P_{6401}$ | | | | | | | | $P_{640\ 480}$ |
| | | | | | | | | |
| | | | | | | | | |
| $P_{N1}$ | | | | $P_{NM}$ | | | | |
| | | | | | | | | |
| | | | | | | | | |
| $P_{41}$ | $P_{42}$ | $P_{43}$ | $P_{44}$ | | | | | |
| $P_{31}$ | $P_{32}$ | $P_{33}$ | $P_{34}$ | | | | | |
| $P_{21}$ | $P_{22}$ | $P_{23}$ | $P_{24}$ | $P_{2M}$ | | | | |
| $P_{11}$ | $P_{12}$ | $P_{13}$ | $P_{14}$ | — — $P_{1M}$ — — | | | | $P_{1\ 480}$ |

$C_N$, $C_3$, $C_2$, $C_1$

SELF-ENCODED DELTAS FOR DIGITAL VIDEO DATA TRANSMISSION

This is a continuation of application Ser. No. 08/365,696 filed on Dec. 29, 1994, now abandoned, which is a continuation-in-part of U.S. application Ser. No. 08/118,929 filed on Sep. 9, 1993, as attorney docket no. 366403-814, now U.S. Pat. No. 5,448,297, which is a continuation-in-part of U.S. application Ser. No. 08/078,931, filed on Jun. 16, 1993, as attorney docket no. 366403-756, now U.S. Pat. No. 5,351,085.

BACKGROUND OF THE INVENTION

This invention relates to techniques for compressing and decoding digital video data, and more particularly to difference encoding and decoding of digital video data.

In the field of digital video imaging there has been a continuing effort to find new and better ways to transmit and receive image data. In particular, it has been a constant goal to reduce the amount of data actually transmitted, while at the same time maintaining acceptable received image quality (i.e. devoid of artifacts that are distracting or noticeable to a human viewer). It has also been a goal to find more time-efficient and hardware-efficient ways to process the data that is transmitted.

One technique that has proven useful is to transmit a first frame of data followed by data characterizing the differences between the first frame and a second frame immediately subsequent thereto, and then transmitting data characterizing the differences between the second frame and a third frame immediately subsequent to the second frame, and so on. One main potential advantage of this approach is that oftentimes there are relatively large areas of the image that do not change significantly (if at all) from frame to frame. The difference data for those areas consists of significantly-long strings of zeros which can be very efficiently compressed using various standard techniques.

The approach described above is depicted in FIG. 1 (Prior Art), wherein the data for each individual pixel (as represented by the general pixel NM as shown) for frame $F_1$ is subtracted from that of frame $F_2$ and is transmitted (after compression) as $D_2$. To reconstruct the data for $F_2$, the difference data for $D_2$ is added to the frame data for $F_1$. This process is repeated for frame $F_3$ and all ensuing frames as shown.

The above-described prior art approach has been used successfully, but Applicant has discovered that it is not the most efficient technique, since it requires (at the receiver) the temporary storage of an immediately-previous frame's data in order to reconstruct a current frame's data.

It is therefore an object of Applicant's invention to exploit temporal redundancy in digital video data transmission systems, without having to store and reference the previous frame's data at the receiver, by means of what Applicant has termed "self-encoded deltas."

SUMMARY OF THE INVENTION

Applicant has discovered that it is not necessary to store the immediately-previous frame of data in the receiver while the next frame's differences are being added thereto. Instead, for each frame, only the first (left-most) column of complete pixel data is sent, in order to "get started" on transmitting difference values for the rest of the frame. This is accomplished by employing Applicant's novel technique of using "self-encoded deltas" within an individual frame instead of calculating and sending all the deltas between adjacent frames. In particular, at the transmitter, the pixel values in an immediately-previous frame are compared with values of corresponding pixels in a current frame. If the difference does not exceed a particular magnitude (i.e. a "threshold" set by the system designer), a "no-change" signal is encoded for each such pixel in the current frame to be transmitted. If, on the other hand, the threshold magnitude is exceeded, then instead of sending the difference between corresponding pixels in the two frames, the difference between the current pixel and an adjacent pixel in the current frame is computed and encoded for transmission. The receiver then "builds" each frame by adding each new set of column differences, determined as described above, to the sum for the immediately-previous column within the frame. As compared with the prior art, this approach requires less storage space (i.e. buffer memory) at the receiving end, less computing time, and has the added benefit of eliminating the undesirable "bleed through" artifact, while at the same time efficiently exploiting temporal redundancy between successive frames.

BRIEF DESCRIPTION OF THE DRAWING

FIG. 2 shows the details of the layout of a typical digital video frame that is useful for describing the instant invention.

DETAILED DESCRIPTION

Figure 1:
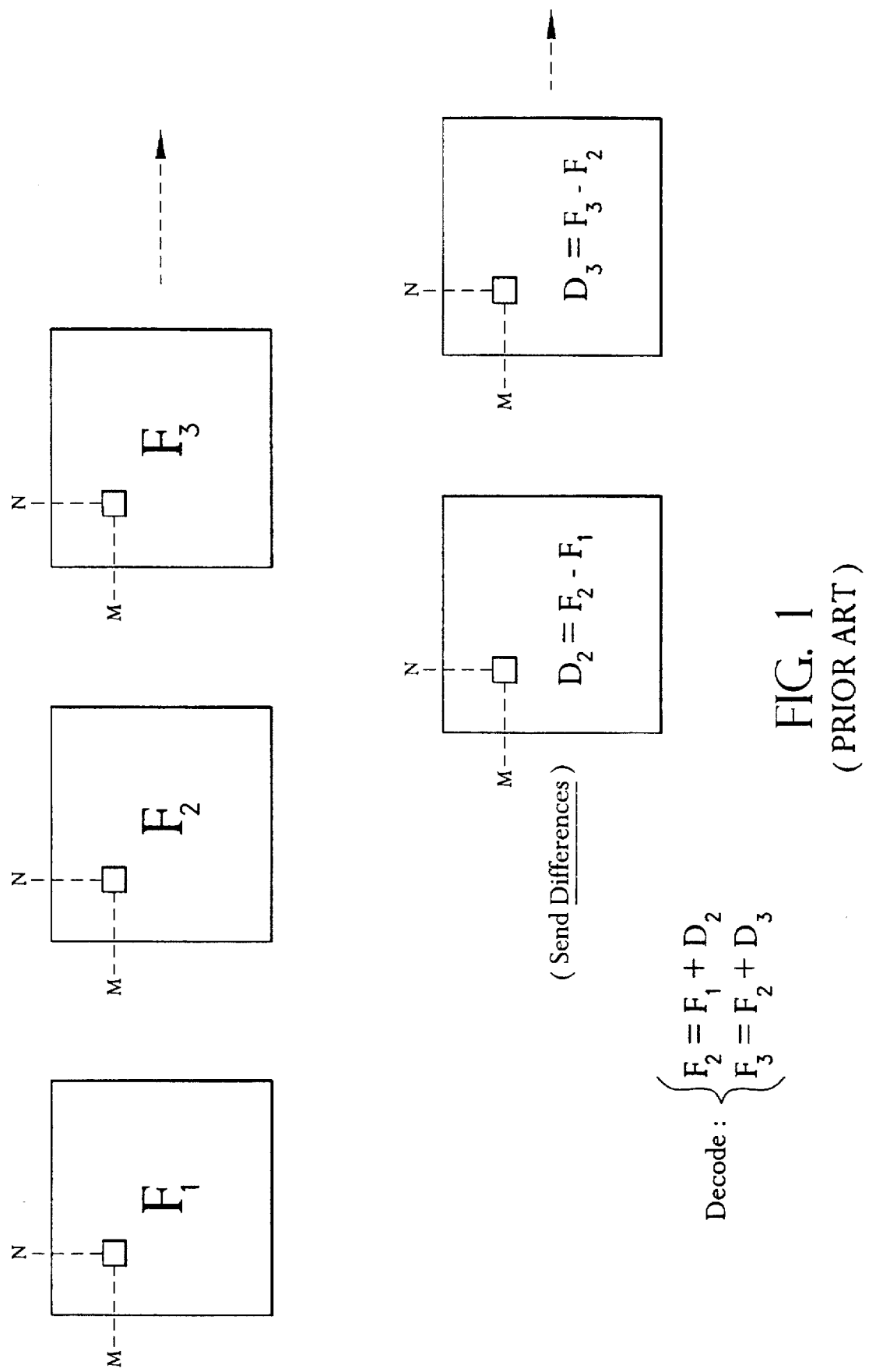
FIG. 1 (Prior Art) shows a known technique for sending and receiving difference data.
Figure 3:
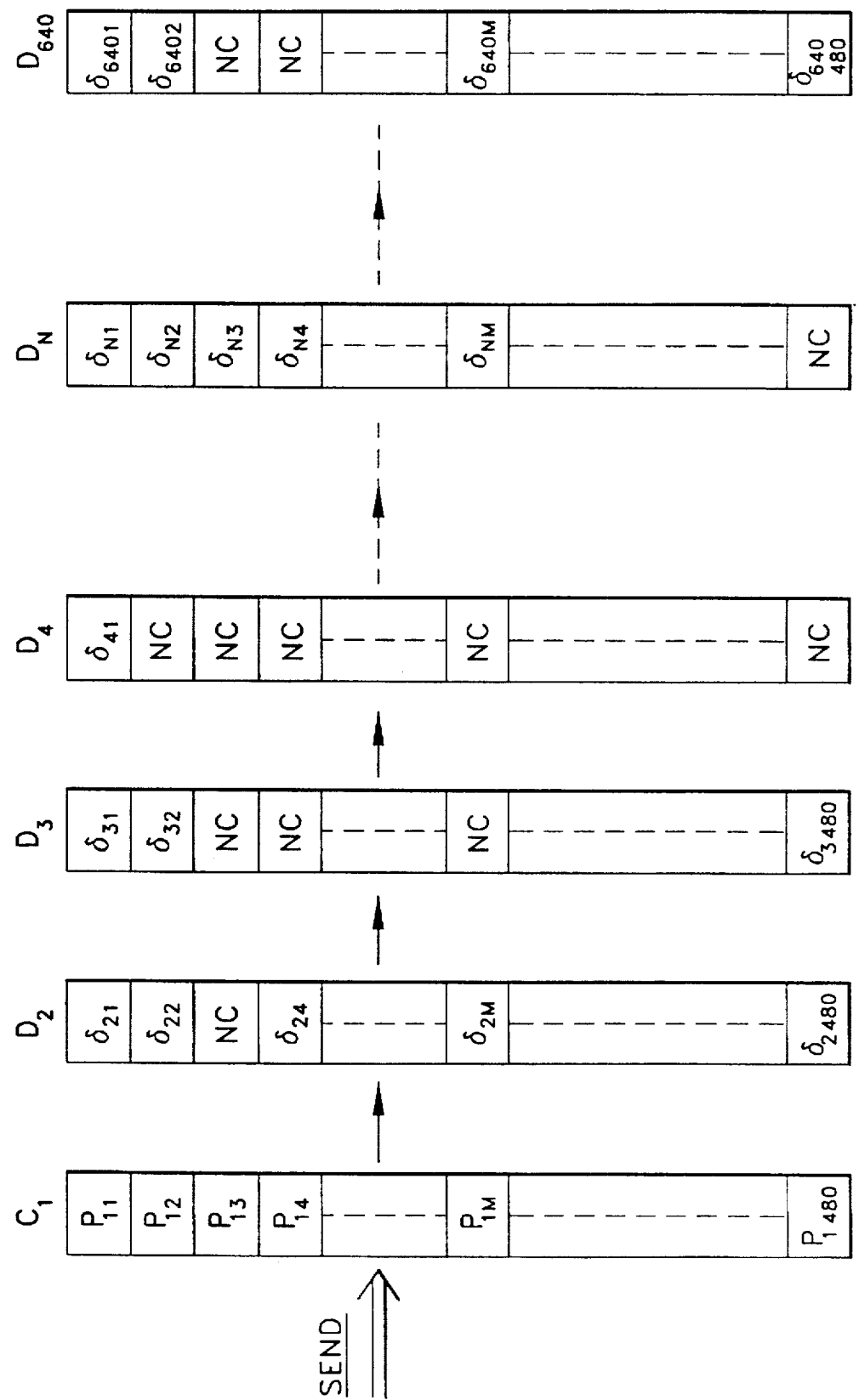
FIG. 3 depicts a version of the transmission technique of the instant invention.

Referring now to FIG. 2, therein depicted is a frame of digital data that is 640 pixels wide and 480 pixels deep. In one embodiment of the instant invention, the full pixel data for the pixels in the left-most column $C_1$ of the frame is initially prepared for transmission. At the transmitter, the data for $C_2$ of the immediately-previous frame is then subtracted pixel-by-pixel from the corresponding data contained in $C_2$ of the current frame. This produces a column of differences. If any of these differences are less than a given threshold magnitude they are encoded as a "no-change" value; for any differences that are greater than the threshold magnitude, they are discarded, and in their place are inserted the differences between the corresponding pixels in $C_2$ of the current frame and $C_1$ of the current frame! These difference values calculated from the same frame are termed by the Applicant as "self encoded deltas". The resulting column of hybrid difference values ($D_2$) (including, generally, some no-change values and some self-encoded deltas) is then prepared for transmission immediately subsequent to the transmission of $C_1$ as shown in FIG. 3.

The respective "no change" signals or the appropriate self-encoded difference values (i.e. "deltas") are thusly calculated and prepared for transmission for each column, $D_N$, of the current frame. Applicant has determined that it is desirable to set a variable threshold value for these deltas. The threshold value for determining a "no change" signal can be adjusted for various practical applications as a design choice by the system designer. The data thus created is typically compressed, using standard compression techniques, prior to being transmitted to the receiver.

Figure 4:
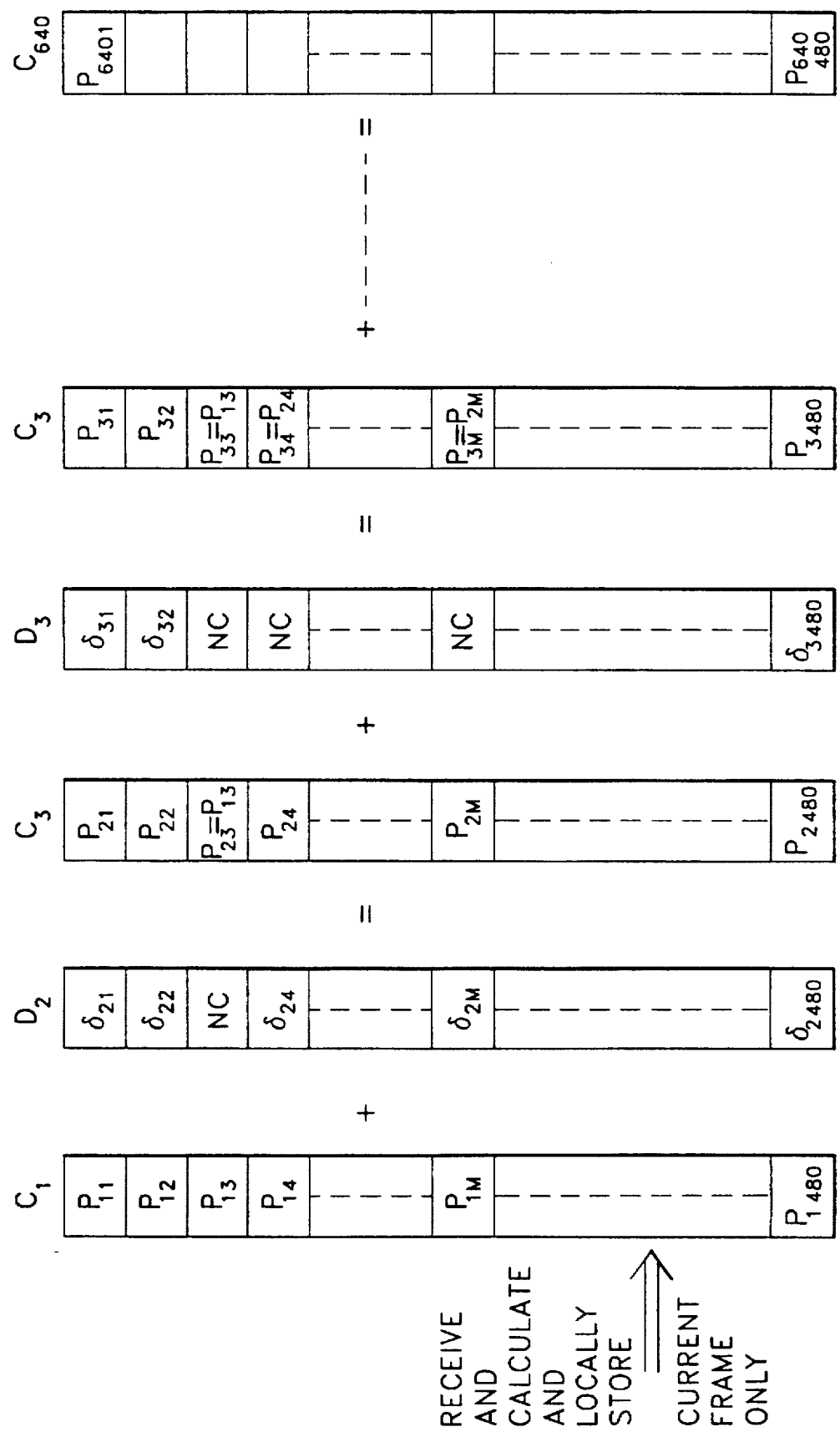
FIG. 4 shows a version of the reception and computation technique of the instant invention.
Figure 5:
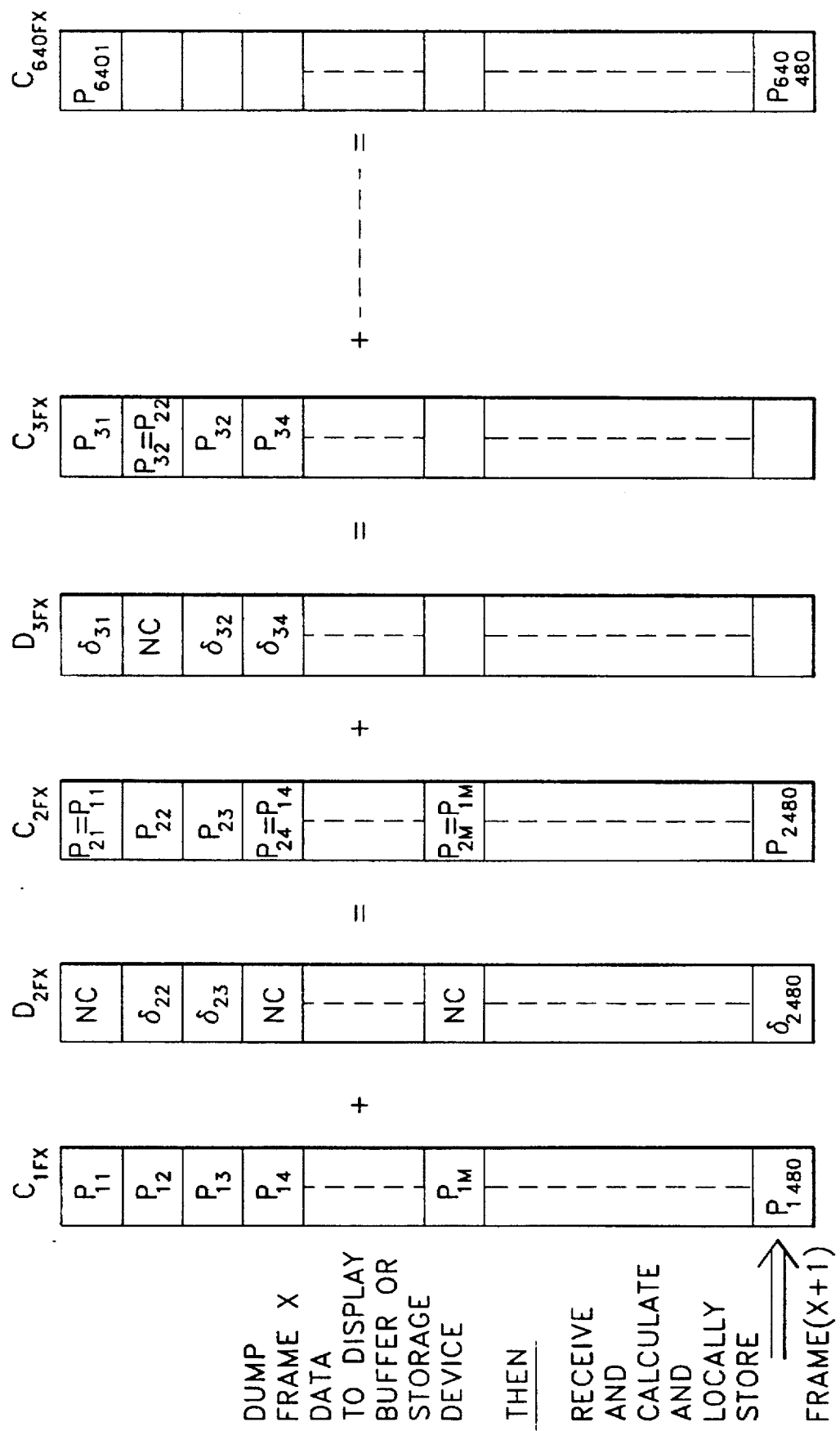
FIG. 5 shows the process of producing a subsequent frame of data in accordance with the instant invention.

At the receiving end, the first column of data of the frame is received, decompressed, and added, pixel-by-pixel, to the immediately subsequent decompressed difference column, $D_2$, to reproduce the second column $C_2$ of the received frame. The next column of decompressed differences, $D_3$, is then added, pixel-by-pixel to the reproduced $C_2$ to generate $C_3$, and so on for the entirety of the frame as shown in FIG. 4. Once the entire frame is reproduced at the receiving end and stored in a display buffer, it can then be dumped to a memory device for storage, or to a display device for immediate display. It is not necessary to store (locally) the received frame data at the receiver station while the next frame data is being processed, due to the fact that the next frame is transmitted independently but in the same manner as described above. The first column of data for the next frame is "built upon" by its subsequent frame difference columns, $D_N$, to generate the next reproduced frame at the receiving end as depicted in FIG. 5.

Figure 6:
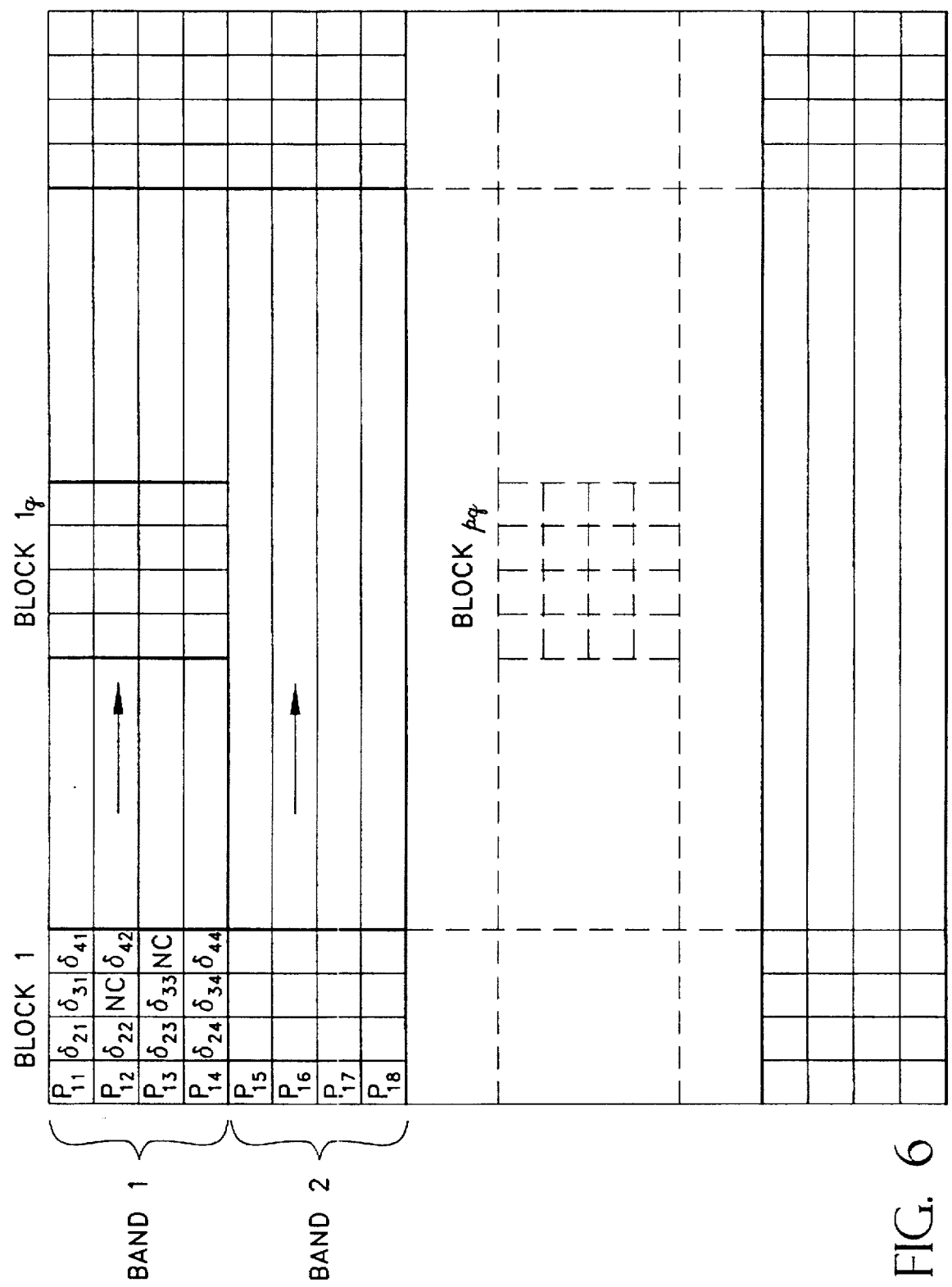
FIG. 6 shows the frame divisions for an alternative embodiment of the instant invention.

Referring now to FIG. 6, therein depicted is a preferred practical implementation of Applicant's invention. The purpose of this alternative embodiment is to accommodate the use of specialized compression techniques that work very efficiently for 4×4 groups of pixels.

In particular, Applicant has developed an approach employing self-encoded deltas for a processing and transmission system that operates on 4×4 blocks, $B_{pq}$ of pixels, in sequential horizontal rows of these blocks from left to right, and sequentially from top to bottom on a video frame.

With this technique, instead of starting with an entire first left-most column of pixel values, only the values for the first four pixels in the first (left-most) column are used to start the process. The differences for remaining pixels in the first horizontal four-row band are calculated at the transmitting end of the system, and the data for the first band is transmitted in sequential compressed 4×4 groups from left to right across the band. The same process in then used for Band 2 and so on for the entire frame. With this technique, for sequential frames with little image change, many 4×4 blocks are encoded entirely as "no change" blocks. In such cases, very significant data compression factors are accomplished since only one signal is sent to represent an entire 4×4 block of data! Once again, only the actual pixel values in the first (left-most) column are needed, all the rest of the frame being transmitted as compressed differences. This embodiment is especially well-suited for efficient processing by 32-bit processors such as the Intel Pentium™ processor.

Figure 7:
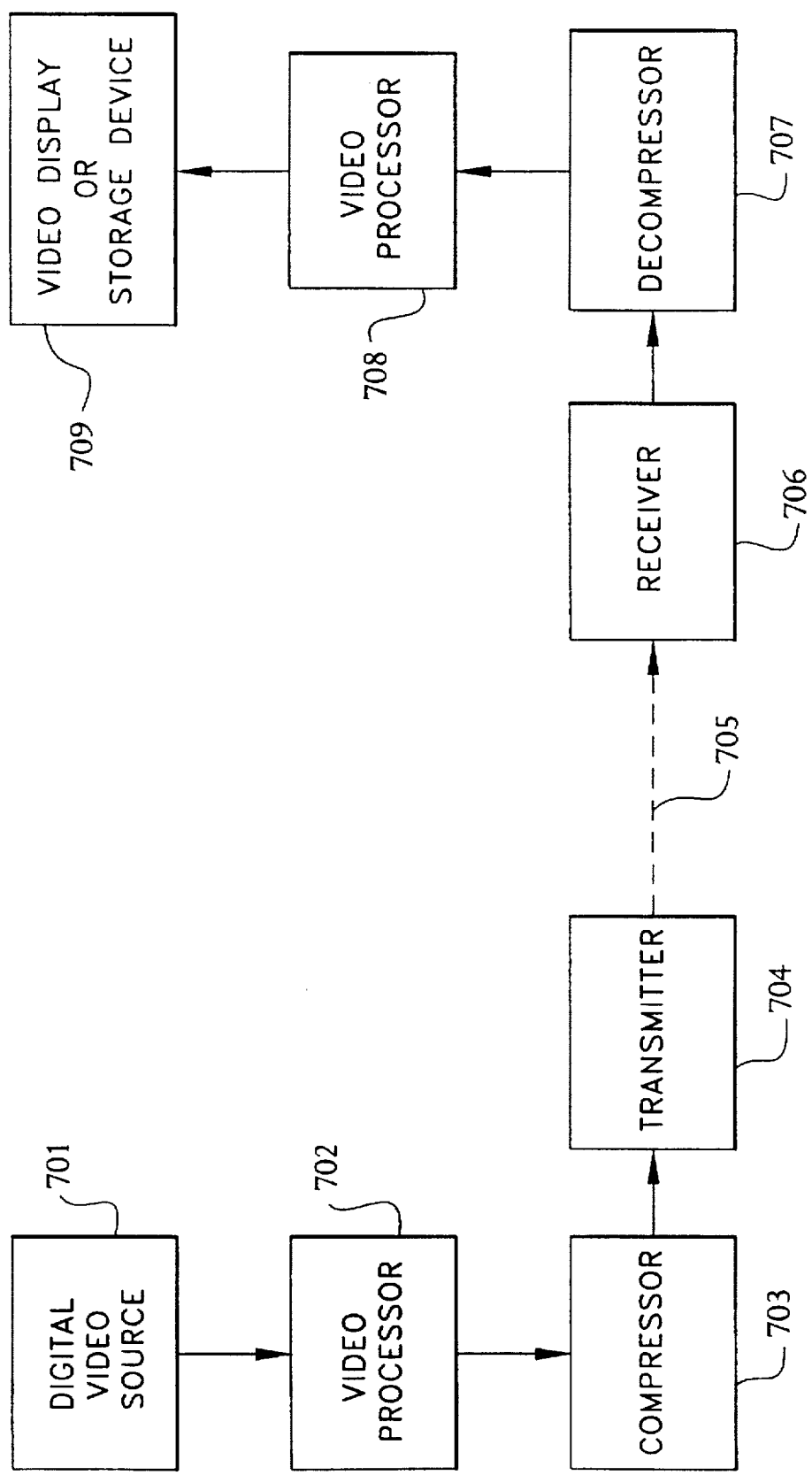
FIG. 7 shows a block diagram of a typical transmission-reception system suitable for employing the instant invention.

A block diagram of a processing transmission-reception system suitable for implementing the instant invention is shown in FIG. 7. Therein, digital video source 701 could be a digital video camera output buffer or some other digital video data storage device. The pixel-by-pixel digital frame data from source 701 is acted upon by video processor 702 in accordance with one of the techniques described above by means of software program designed for that particular processor. Those skilled in the art will be readily able to implement such a program for a particular processor in view of the above-described techniques. Once the video processor 702 has implemented one of the above-described self-encoded delta schemes, the resulting data is compressed by compressor 703 using well-known digital data compression techniques. The compressed data is then sent along transmission medium 705 by transmitter 704. Receiver 706 gathers the compressed data and sends it on to decompressor 707 which in turn reconstructs the original self-encoded delta data. These received and decompressed self-encoded deltas are then converted by video processor 708 back into full frames of data suitable for being used to drive a video display 709 or for video storage. This is a standard digital video transmission system that has been modified to implement the novel processing method of the instant invention.

Figure 8:
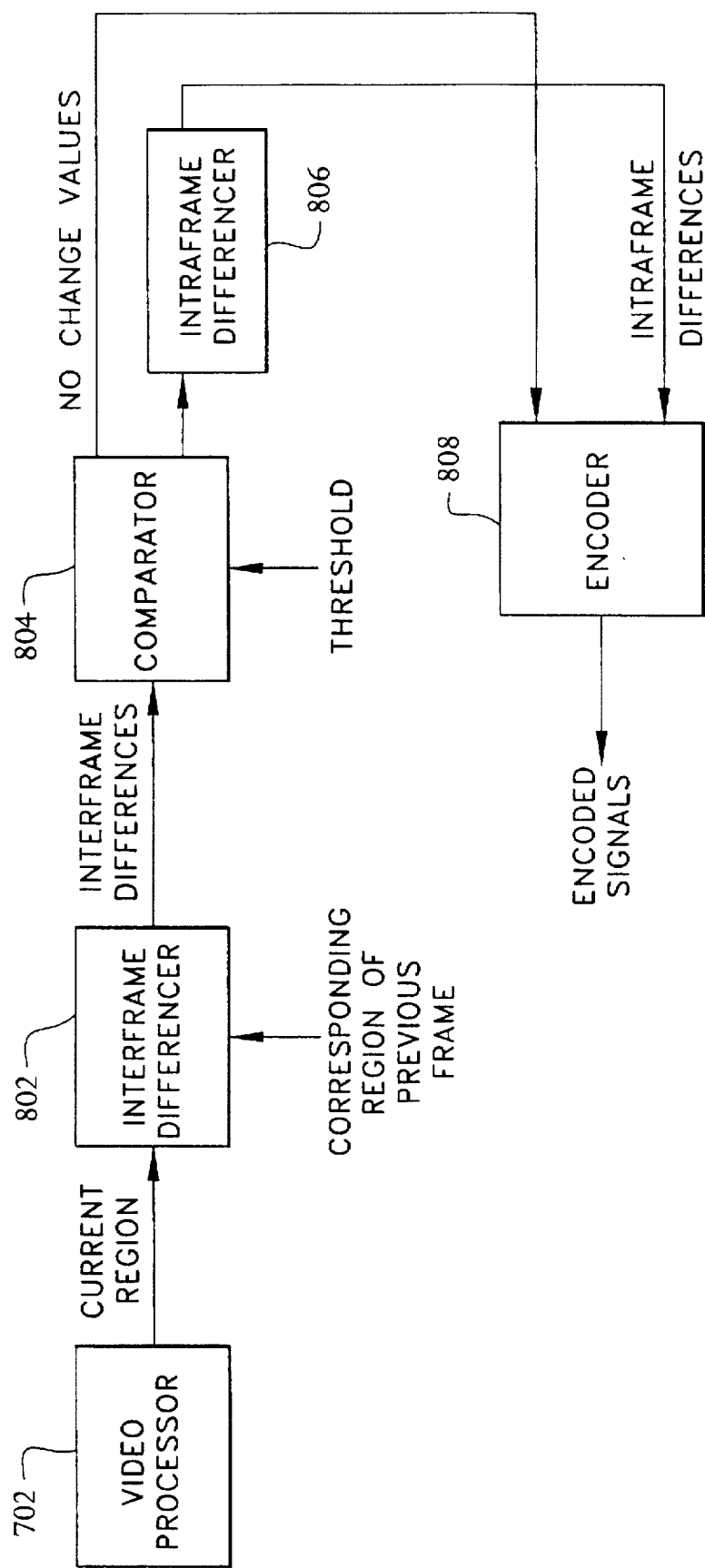
FIG. 8 shows a block diagram of the video processor and compressor of FIG. 7.
Figure 9:
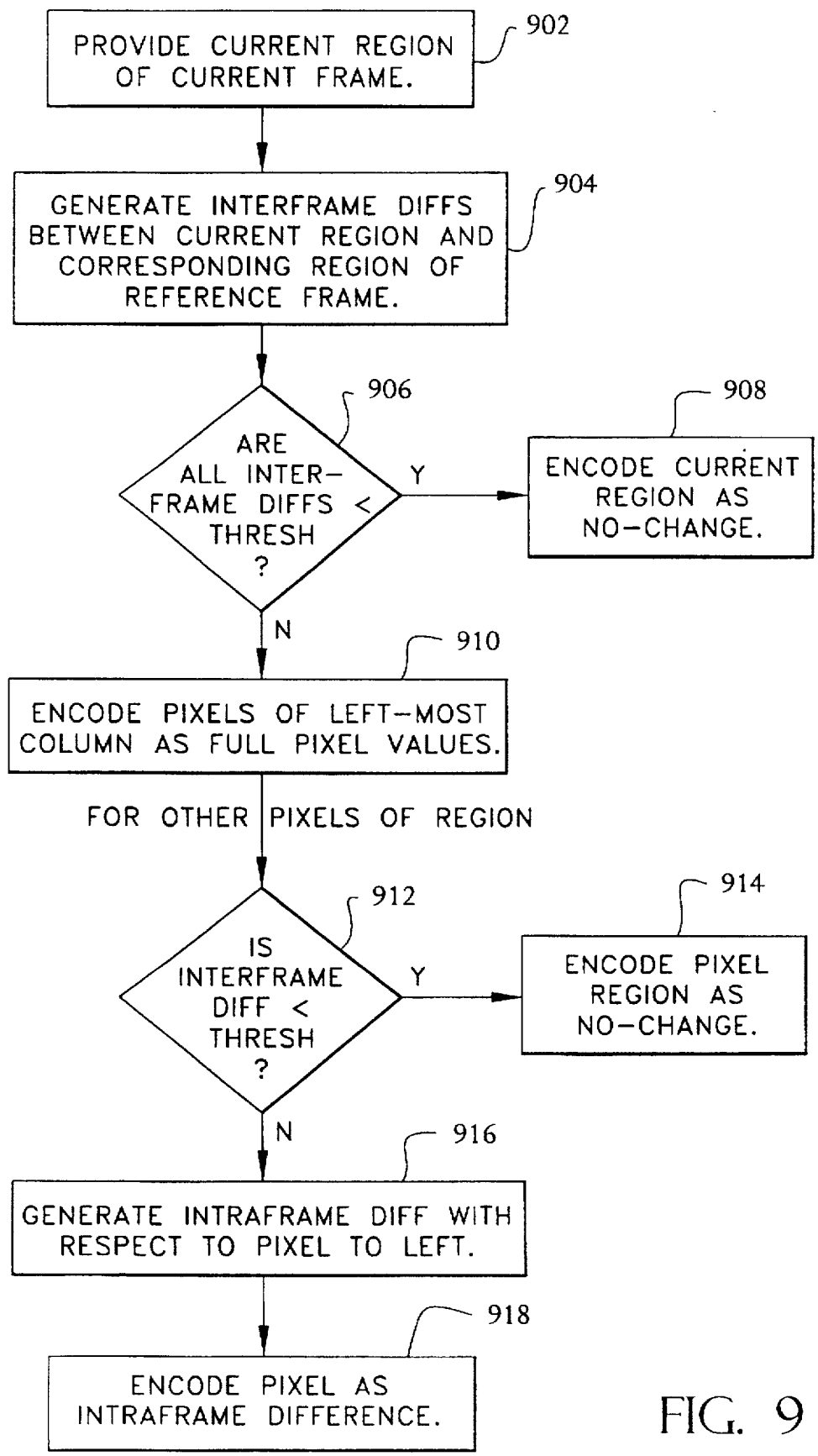
FIG. 9 shows a flow diagram of the processing implemented by the video processor and compressor of FIG. 7.

Referring now to FIGS. 8 and 9, therein depicted, respectively, are a block diagram of and a flow chart of the processing implemented by video processor 702 and compressor 703 of FIG. 7. Video processor 702 of FIG. 8 provides the current region of the current frame (step 902 of FIG. 9). Interframe differencer 802 generates interframe differences between the pixels of the current region and the pixels of the corresponding region of a reference frame (e.g., the previous frame) (step 904). Comparator 804 compares these interframe differences to a specified threshold (steps 906 and 912). If all of the interframe differences are less than a specified threshold (step 906), the encoder 808 encodes the entire current region as a no-change region (step 908). Otherwise, encoder 808 encodes the pixels in the left-most column of the current region as full pixel values (step 910). For each of the other pixels in the current region, if the interframe difference is less than the specified threshold (step 912), then encoder 808 encodes the pixel as a no-change value (step 914). Otherwise, intraframe differencer 806 generates the intraframe difference between the pixel and its neighbor to the left (step 916) and encoder 808 encodes the pixel as the intraframe difference (step 918).

Although the method of the instant invention has been described with respect to particular embodiments, the scope of the invention is not limited to these embodiments, but, rather, is defined by the appended claims and their fair equivalents.

What is claimed is:

1. A method for encoding image signals, comprising the steps of:
   (a) generating interframe differences between a region of a current frame and a corresponding region of a reference frame;
   (b) selecting one of two encoding modes for the region based on the interframe differences, wherein:
      a no-change encoding mode is selected if the interframe differences are less than a threshold value; and
      an intra encoding mode is selected if the interframe differences are not less than the threshold value; and
   (c) applying the selected encoding mode to encode the region, wherein:
      under the no-change encoding mode, the region is always encoded as a no-change value indicating that a decoded region corresponding to the region is identical to the corresponding region of the reference frame; and
      under the intra encoding mode, the region is always encoded using intraframe encoding.

2. The invention of claim 1, wherein, under the intra encoding mode, the region is always encoded using intraframe differences.

3. The invention of claim 2, wherein, under the intra encoding mode, the first column of the region is encoded based on full pixel values; and each subsequent column in the region is encoded based on intraframe differences.

4. A computer-readable storage medium encoded with computer program code for encoding image signals, wherein, when the computer program code is implemented on a computer, the computer performs the steps of:

(a) generating interframe differences between a region of a current frame and a corresponding region of a reference frame;

(b) selecting one of two encoding modes for the region based on the interframe differences, wherein:

a no-change encoding mode is selected if the interframe differences are less than a threshold value; and an intra encoding mode is selected if the interframe differences are not less than the threshold value; and (c) applying the selected encoding mode to encode the region, wherein:

under the no-change encoding mode, the region is always encoded as a no-change value indicating that a decoded region corresponding to the region is identical to the corresponding region of the reference frame; and under the intra encoding mode, the region is always encoded using intraframe encoding.

5. The invention of claim 4, wherein, under the intra encoding mode, the region is always encoded using intraframe differences.

6. The invention of claim 5, wherein, under the intra encoding mode, the first column of the region is encoded based on full pixel values; and each subsequent column in the region is encoded based on intraframe differences.

7. A method for decoding encoded image signals, comprising the steps of:

(a) receiving encoded image signals corresponding to one or more image regions, wherein each image region has been encoded using one of a no-change encoding mode and an intra encoding mode;

(b) generating one or more decoded image regions using the encoded image signals, wherein:

if an image region had been encoded using the no-change encoding mode, then the corresponding decoded image region is identical to a corresponding decoded region of a reference frame; and if an image region had been encoded using the intra encoding mode, then the corresponding decoded image region is generated from the encoded image signals using intraframe decoding.

8. The invention of claim 7, wherein the decoded image regions are written to the same memory locations as the reference frame, such that:

the corresponding region of the reference frame is left unchanged for an image region that had been encoded using the no-change encoding mode; and the corresponding region of the reference frame is overwritten for an image region that had been encoded using the intra encoding mode.

9. The invention of claim 7, wherein, under the intra encoding mode, each image region had been encoded using intraframe differences.

10. The invention of claim 9, wherein, under the intra encoding mode, the first column of each image region had been encoded based on full pixel values; and each subsequent column in each image region had been encoded based on intraframe differences.

11. A computer-readable storage medium encoded with computer program code for decoding encoded image signals, wherein, when the computer program code is implemented on a computer, the computer performs the steps of:

(a) receiving encoded image signals corresponding to one or more image regions, wherein each image region had been encoded using one of a no-change encoding mode and an intra encoding mode;

(b) generating one or more decoded image regions using the encoded image signals, wherein:

if an image region had been encoded using the no-change encoding mode, then the corresponding decoded image region is identical to a corresponding decoded region of a reference frame; and if an image region had been encoded using the intra encoding mode, then the corresponding decoded image region is generated from the encoded image signals using intraframe decoding.

12. The invention of claim 11, wherein the decoded image regions are written to the same memory locations as the reference frame, such that:

the corresponding region of the reference frame is left unchanged for an image region that had been encoded using the no-change encoding mode; and the corresponding region of the reference frame is overwritten for an image region that had been encoded using the intra encoding mode.

13. The invention of claim 11, wherein, under the intra encoding mode, each image region had been encoded using intraframe differences.

14. The invention of claim 13, wherein, under the intra encoding mode, the first column of each image region had been encoded based on full pixel values; and each subsequent column in each image region had been encoded based on intraframe differences.

* * * * *